J. L. AND A. C. VAUCLAIN.
FASTENER FOR WHEEL HUB CAPS.
APPLICATION FILED JAN. 6, 1921.
1,382,577.
Patented June 21, 1921.
2 SHEETS—SHEET 1.
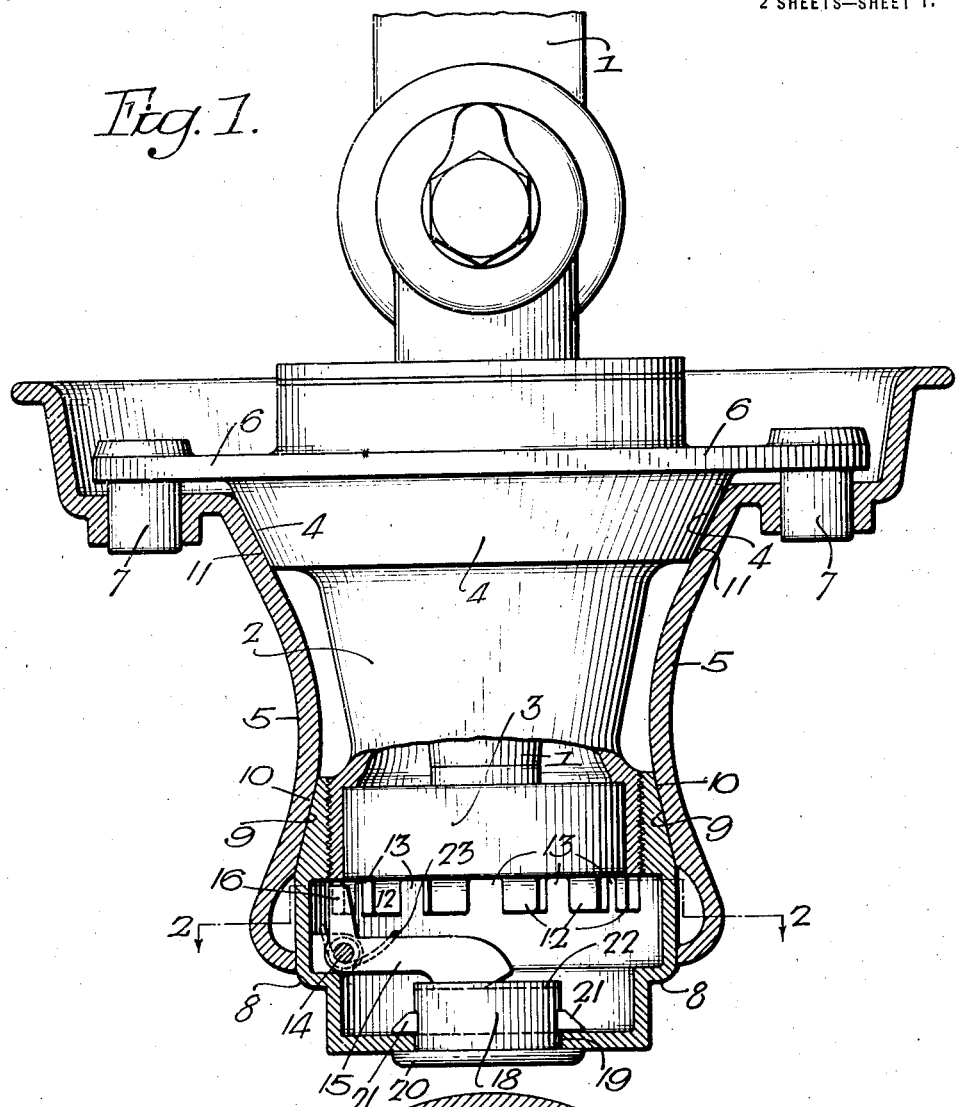
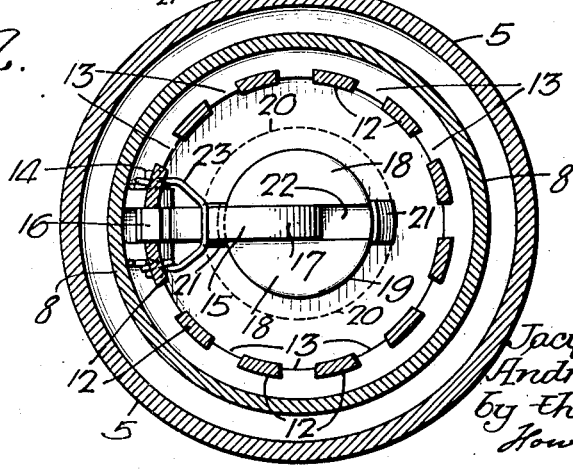
Inventors—
Jacques L. Vauclain,
Andrew C. Vauclain.
by their Attorneys
Howson & Howson

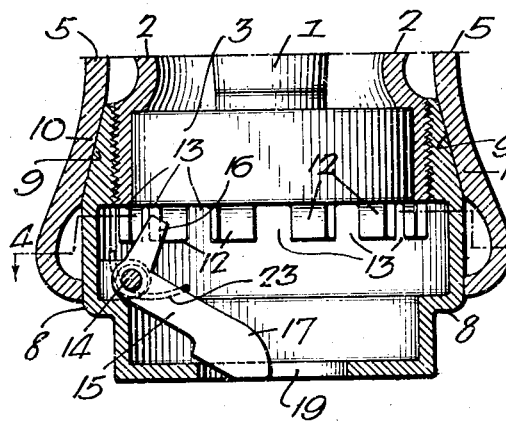
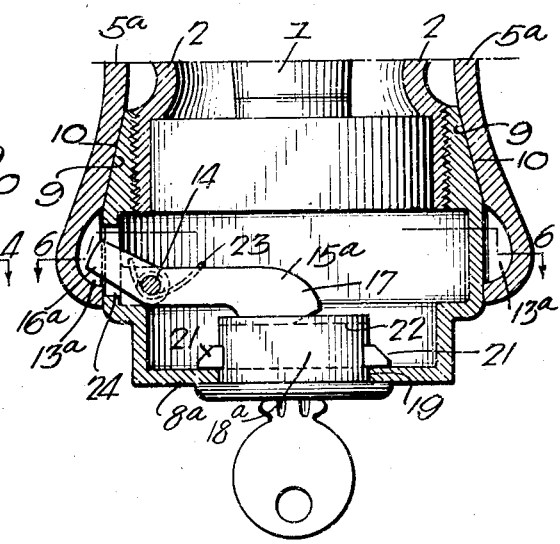
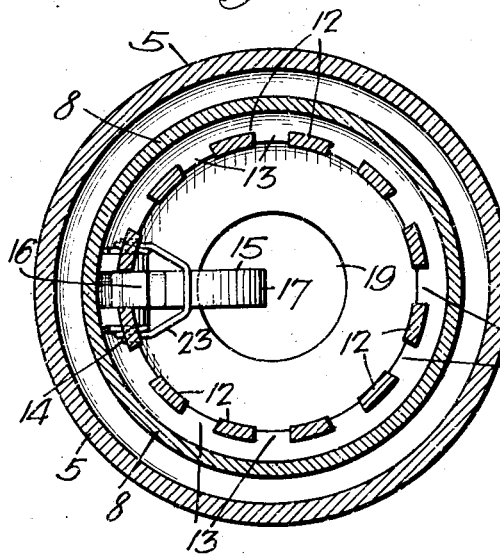
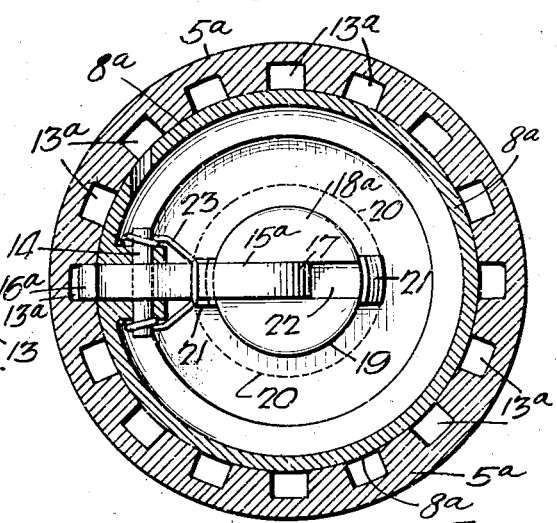

UNITED STATES PATENT OFFICE.

JACQUES L. VAUCLAIN, OF HAVERFORD, AND ANDREW C. VAUCLAIN, OF PHILADELPHIA, PENNSYLVANIA.

FASTENER FOR WHEEL-HUB CAPS.

1,382,577.  Specification of Letters Patent.  Patented June 21, 1921.

Application filed January 6, 1921. Serial No. 435,384.

*To all whom it may concern:*

Be it known that we, JACQUES L. VAUCLAIN and ANDREW C. VAUCLAIN, citizens of the United States, residing, respectively, in Haverford, Pennsylvania, and Philadelphia, Pennsylvania, have invented certain Improvements in Fasteners for Wheel-Hub Caps, of which the following is a specification.

Our invention relates to certain improvements in means for holding automobile and other wheels to axles, or spare wheels to carrying studs.

One object of our invention is to provide means for securely holding the caps of a wheel hub in place.

A further object of the invention is to provide means whereby the cap can be locked to the hub of a vehicle, or to a carrying stud, as fully described hereinafter.

In the acompanying drawings:

Figure 1 is a plan view of one end of a wheel hub, showing the parts partly in section;

Fig. 2 is a sectional view on the line 2—2, Fig. 1;

Fig. 3 is a view, similar to Fig. 2, with the lock removed and the fastening in position to allow for the removal of the cap;

Fig. 4 is a sectional view on the line 4—4, Fig. 3;

Fig. 5 is a sectional view illustrating a modification, and

Fig. 6 is a sectional view on the line 6—6, Fig. 5.

The invention is shown as applied to a hub cap used in connection with the hub of a wheel, but it will be understood that it can be used in connection with other types of wheels without departing from the essential features of the invention.

Referring to the drawings, 1 is the axle of an automobile, in the present instance. 2 is a hub. In this hub are two sets of ball bearings, which are located between the axle 1 and the hub 2. Fig. 1 is broken away to illustrate the raceway 3 of the outer ball bearing. The hub 2 is beveled at 4, and mounted on the hub is a wheel hub 5 of a wire wheel. On the flange 6 of the hub are pins 7, which project through openings in the wheel hub 5 so that the wheel hub must turn with the main hub.

8 is a cap having a beveled surface 9 at the inner end. This beveled surface bears against the beveled portion 10 of the wheel hub, while the beveled portion 4 of the main hub bears against the beveled surface 11 of the wheel hub. The cap has an internal thread adapted to an external thread on the main hub so that, when the cap is turned, it forces the wheel hub firmly in contact with the two bearing surfaces 4 and 9, holding the wheel rigidly to the main hub 2. Projecting from the outer end of the main hub is an annular series of lugs 12 separated by spaces 13. Pivoted to the cap 8 at 14 is a lever 15 having an arm 16, which is designed to enter one of the spaces 13 when the arm 17 of the lever is forced in by the lock casing 18 so as to lock the cap rigidly to the hub. The lock casing 18 is adapted to an opening 19 in the cap and has a flange 20, which overlaps the cap and the bolts 21 of the lock can be projected, as shown in Fig. 1, in order to lock the casing firmly to the cap. The inner end of the lock casing 18 is slotted at 22 and the width of the slot is equal to the width of the arm 17 of the lever 15. This prevents the lock casing turning in the cap.

When the bolts 21 are withdrawn and the lock casing 18 is removed, as in Fig. 3, the lever 15 is forced out by a spring 23 so that the arm 16 will be clear of the spaces 13. When in this position the cap can be turned so that it can be easily removed from the hub, after which the wheel can be withdrawn from the hub and another wheel placed in position, if desired. In replacing the cap, it is turned until it is adjusted to the position desired, when the lock casing is applied, which will force the lever into the position shown in Fig. 1, locking the cap to the hub. By this arrangement, there is no liability of the cap being accidentally loosened, as the parts are rigidly connected. Furthermore, by providing a lock the wheel cannot be removed without detaching the lock.

In Fig. 5, a modification is illustrated, in which the recesses 13ª are formed on the wheel hub 5ª. The arm 16ª of the lever 15ª extends through an opening 24 in the hub cap 8ª and enters one of the recesses 13ª when the lock 18ª is forced into position, as in Fig. 5, locking the hub cap rigidly to the wheel hub.

The locks are preferably all of the same type so that a single key can be used.

While we have described the invention as used in connection with hubs and axles, it will be understood that it can be used in securing a spare wheel to a carrying hub or stud.

We claim:

1. The combination of a hub; a wheel hub mounted thereon; a cap and means for holding the cap to the hub, said cap acting to retain the wheel hub on the hub; an internal locking device carried by the cap and arranged to engage one of the fixed parts, said cap having an opening and a lock casing arranged to project into the opening and engage the locking device; and means for securing the lock casing to the cap.

2. The combination of a main hub; a wheel hub mounted thereon, said main hub having an external screw thread; a cap having an internal screw thread adapted to the thread on the main hub and arranged to bear against the wheel hub; a lever pivotally mounted within the cap; a series of receses on one of the fixed parts into which one arm of the lever can be projected, the other arm of the lever extending toward the center of the cap; a movable lock casing bearing against the last mentioned arm to hold the lever in the locked position and preventing the cap turning on the hub and means for locking the lock casing to the cap.

3. The combination of a hub; a wheel hub mounted thereon, said main hub having a screw thread thereon; a cap having a screw thread adapted to the main hub and arranged to engage the wheel hub in order to hold it to the main hub; a series of recesses in the end of the main hub; a lever pivoted to the cap and having an arm arranged to enter one of the recesses to lock the cap to the hub; and a detachable lock casing mounted in the cap and arranged to hold the lever in the locked position so as to prevent the cap turning on the hub.

4. The combination of a hub having a screw thread thereon; a wheel hub mounted on the main hub; a cap having an internal screw thread adapted to the thread on the hub and having a beveled surface arranged to bear against the wheel hub and to fasten the wheel hub to the main hub, said main hub having a series of projections at the end spaced apart to form recesses; a lever pivotally mounted in the cap and having an arm arranged to enter one of the spaces between the projections on the hub, said lever having another arm extending toward the center of the cap; an opening in the cap; a lock casing arranged to be mounted in the opening; and means for locking the casing to the cap, said lock casing holding the lever in engagement with the hub.

5. The combination of a hub having a screw thread thereon; a wheel hub mounted on said main hub; a cap having a screw thread adapted to the thread on the main hub and arranged to bear against the wheel hub, said main hub having a series of projections at the outer end spaced apart to form recesses; a lever pivotally mounted in the cap and arranged to enter one of the recesses, said cap having an opening; a lock casing adapted to the opening; and means for locking the casing to the cap, said cap being slotted at the inner side to receive one arm of the lever, the lever preventing the lock casing turning in the cap.

6. The combination of a hub; a wheel hub removably mounted thereon; a cap mounted on the hub and arranged to hold the wheel hub on the hub; an opening in the cap; and a detachable lock casing mounted in the opening and having means for securing it to the cap, said casing locking the cap in position.

JACQUES L. VAUCLAIN.
ANDREW C. VAUCLAIN.